United States Patent

Schuijers et al.

(10) Patent No.: US 11,800,134 B2
(45) Date of Patent: Oct. 24, 2023

(54) SYSTEM FOR PERFORMING IMAGE MOTION COMPENSATION

(71) Applicant: KONINKLIJKE PHILIPS N.V., Eindhoven (NL)

(72) Inventors: Erik Gosuinus Petrus Schuijers, Breda (NL); Yannyk Parulian Julian Bourquin, Eindhoven (NL); Jonathan Alambra Palero, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/771,512

(22) PCT Filed: Oct. 26, 2020

(86) PCT No.: PCT/EP2020/079993

§ 371 (c)(1),
(2) Date: Apr. 25, 2022

(87) PCT Pub. No.: WO2021/089351

PCT Pub. Date: May 14, 2021

(65) Prior Publication Data

US 2022/0385933 A1 Dec. 1, 2022

(30) Foreign Application Priority Data

Nov. 6, 2019 (EP) .................................... 19207445

(51) Int. Cl.
*H04N 19/51* (2014.01)
*G06T 7/254* (2017.01)
(Continued)

(52) U.S. Cl.
CPC ............. *H04N 19/51* (2014.11); *G06T 7/254* (2017.01); *H04N 23/73* (2023.01); *H04N 23/74* (2023.01)

(58) Field of Classification Search
CPC .... G06T 7/254; H04N 19/51; H04N 23/6811; H04N 23/73; H04N 23/74; H04N 23/80
See application file for complete search history.

(56) References Cited

U.S. PATENT DOCUMENTS

| 2002/0113882 A1* | 8/2002 | Pollard ................ H04N 1/2112 348/370 |
| 2003/0174777 A1* | 9/2003 | Itoh ........................ H04N 5/145 375/E7.262 |

(Continued)

FOREIGN PATENT DOCUMENTS

WO    2021089422 A1    5/2021

OTHER PUBLICATIONS

International Search Report and Written Opinion dated Dec. 18, 2020 for International Application No. PCT/EP2020/079993 Filed Oct. 26, 2020.

(Continued)

*Primary Examiner* — Peter D Le

(57) ABSTRACT

There is provided a system for performing image motion compensation. The system comprises a light source configured to provide pulsed illumination to an object, an imaging unit configured to capture a plurality of images of the object including a first image, a second image, and a third image, and a control unit configured to: determine a first motion map indicating an estimated motion between at least a section in the first image and at least the corresponding section in the second image, determine a second motion map indicating an estimated motion between at least the section in the first image and at least a corresponding section in the third image, or an estimated motion between at least the corresponding section in the second image and at least a corresponding section in the third image, and generate an at least partially motion compensated image.

15 Claims, 8 Drawing Sheets

(51) Int. Cl.
*H04N 23/73* (2023.01)
*H04N 23/74* (2023.01)

(56) References Cited

U.S. PATENT DOCUMENTS

| | | | | |
|---|---|---|---|---|
| 2006/0050335 A1* | 3/2006 | Dorrell | ................ | H04N 1/6086 |
| | | | | 358/516 |
| 2007/0165960 A1* | 7/2007 | Yamada | ................ | H04N 23/88 |
| | | | | 382/254 |
| 2007/0201853 A1* | 8/2007 | Petschnigg | ............ | H04N 23/88 |
| | | | | 348/E5.038 |
| 2007/0263099 A1* | 11/2007 | Motta | .................... | H04N 23/74 |
| | | | | 348/222.1 |
| 2007/0263119 A1* | 11/2007 | Shum | ...................... | H04N 5/275 |
| | | | | 348/371 |
| 2008/0101786 A1 | 5/2008 | Pozniansky | | |
| 2008/0291288 A1 | 11/2008 | Tzur | | |
| 2008/0309823 A1* | 12/2008 | Hahn | ..................... | H04N 5/144 |
| | | | | 348/E5.077 |
| 2009/0245601 A1* | 10/2009 | Cohen | .................. | A61B 5/0059 |
| | | | | 382/128 |
| 2010/0237149 A1* | 9/2010 | Olmstead | ............ | G06K 7/10722 |
| | | | | 235/470 |
| 2011/0205395 A1 | 8/2011 | Levy | | |
| 2013/0100314 A1 | 4/2013 | Li | | |
| 2015/0036737 A1* | 2/2015 | Puri | ..................... | H04N 19/573 |
| | | | | 375/240.02 |
| 2015/0062410 A1 | 3/2015 | Kim | | |
| 2016/0035068 A1* | 2/2016 | Wilensky | ................ | G06T 5/002 |
| | | | | 345/589 |
| 2016/0232672 A1* | 8/2016 | Rezaiifar | ............... | H04N 23/73 |
| 2019/0101382 A1* | 4/2019 | Taubin | ................. | G01B 11/254 |
| 2022/0114734 A1* | 4/2022 | Benson | ................. | H04N 5/272 |

OTHER PUBLICATIONS

Kim, et al: "Robust motion estimation under varying illumination", Image and Vision Computing 23 (2005) 365-375.

Gunnar Farneback: "Two-Frame Motion Estimation Based on Polynomial Expansion", Scandinavian Conference on Image Analysis, SCIA 2003: Image Analysis pp. 363-370.

\* cited by examiner

SYSTEM FOR PERFORMING IMAGE MOTION COMPENSATION

CROSS REFERENCE TO RELATED APPLICATIONS

This application is the U.S. National Phase application under 35 U.S.C. § 371 of International Application No. PCT/EP2020/079993 filed Oct. 26, 2020, which claims the benefit of European Patent Application Number 19207445.8 filed Nov. 6, 2019. These applications are hereby incorporated by reference herein.

FIELD OF THE INVENTION

The present disclosure relates to systems and methods for performing image motion compensation.

BACKGROUND OF THE INVENTION

There has been an increasing demand for non-obtrusive measurement and monitoring devices in the field of personal care and health application, particularly in skin sensing. Current available skin measurement systems provide skin quantification and skin feature monitoring functions that offer consumers information that may be too small to detect, too faint to notice, or too slow to follow by the human eye. In order for these types of systems to be deemed usable by normal consumers, the embedded sensing functions should be sensitive as well as specific. In addition, the robustness of the relevant measurements is also essential in order to build consumer trust.

A critical issue in such imaging measurement systems is that when they are used in an uncontrolled environment, e.g. at home, there are typically inconsistencies in measurement due to undefined and potentially varying ambient lighting. One way to minimize the effect of ambient light is to provide a known artificial light source that is significantly stronger than the ambient light. In this case, the artificial light effectively masks the ambient light. However, especially in sunny outdoor conditions, the brightness of the artificial light could be rendered impractical.

SUMMARY OF THE INVENTION

An alternative way to minimize the effect of ambient light is to compare an image shot with both artificial light and ambient light with an image shot only with ambient light. Subtracting the two images will provide a resultant image that is virtually free from the ambient light and is accordingly highly reproducible. However, one of the disadvantages associated with this method of generating reproducible images is that image subtraction techniques are highly sensitive to subject motion, especially at the edges of the photographed objects. Thus, it is desirable to perform motion compensation prior to the subtraction operation of the images. However, existing motion estimation algorithms, e.g. optical flow algorithm, are not sufficiently robust with respect to large intensity changes. It would therefore be advantageous to provide an improved system for performing image motion compensation, and a method for performing image motion compensation.

To better address one or more of the concerns mentioned earlier, in a first aspect, a system for performing image motion compensation is provided. The system comprises: a light source configured to provide pulsed illumination to an object; an imaging unit configured to capture, while the object is illuminated by the pulsed illumination from the light source, a plurality of images of the object, wherein the plurality of images comprises at least one first image, a second image, and a third image wherein the first and second images are captured by the imaging unit during an on-phase of the pulsed illumination from the light source, and the third image is captured by the imaging unit during an off-phase of the pulsed illumination from the light source; a control unit configured to: determine, based on pixel information of at least one section in the first image and pixel information of at least one corresponding section in the second image, a first motion map indicating an estimated motion between at least one section in the first image and at least the corresponding section in the second image; determine a second motion map by at least extrapolating or interpolating the first motion map, wherein the second motion map indicates an estimated motion between at least the section in the first image and at least one corresponding section in the third image, or an estimated motion between at least the corresponding section in the second image and at least one corresponding section in the third image; and generate an at least partially motion compensated image by applying the second motion map to at least the corresponding section in the third image.

In some embodiments, the control unit may be configured to: determine the first motion map indicating an estimated motion between the first image and the second image based on pixel information on the first image and pixel information of the second image; determine the second motion map based on the first motion map, wherein the second motion map indicates an estimated motion between the second image and the third image; and generate the motion compensated image by applying the second motion map to the third image.

In some embodiments, the plurality of images may be captured such that the first to third images are captured in the sequence of: the first image, the second image, and the third image, or in the sequence of: the third image, the second image, and the first image, and the second motion map may be determined based on extrapolation of the first motion map, wherein the extrapolation of the first motion map comprises performing an additive inversion of the first motion map.

In some embodiments, the plurality of images may be captured such that the first to third images are captured in the sequence of: the first image, the third image, and the second image, and the second motion map may be determined based on interpolation of the first motion map.

In some embodiments, the plurality of images may further comprise a fourth image, the plurality of images may be captured such that the first to fourth images are captured in the sequence of: the fourth image, the first image, the second image, and the third image, the first image, the second image, and the fourth image may be captured during an on-phase of the pulsed illumination from the light source, and the third image may be captured during an off-phase of the pulsed illumination from the light source. In these embodiments, the control unit is configured to: determine the first motion map indicating an estimated motion between the first image and the second image based on pixel information of the first image and pixel information of the second image; determine a third motion map indicating an estimated motion between the first image and the fourth image based on pixel information of the first image and pixel information of the fourth image; determine the second motion map indicating an estimated motion between the second image and the third image based on extrapolation of the first motion map and the third motion map; and generate the motion compensated image by applying the second motion map to the third image.

In some embodiments, the control unit may be further configured to generate an ambient light corrected image by performing a subtraction operation between pixel information corresponding to the at least partially motion compensated image and pixel information corresponding to the first image or the second image.

In some embodiments, the imaging unit may be a rolling shutter camera, and the imaging unit may be configured to capture the plurality of images at an exposure time shorter than the wave period of the pulsed illumination, such that each of the plurality of images comprises a plurality of bright bands and dark bands, wherein a bright band corresponds to a high state of the pulsed illumination and a dark band corresponds to a low state of the pulsed illumination. In these embodiments, the pulse frequency of the illumination provided by the light source is not a multiple integral of the frame rate at which the plurality of images are captured. In these embodiments, one of the first image and the second image may be captured directly before or after the third image. In these embodiments, the control unit may be configured to: select the third image as a base image; determine the first motion map based on pixel information of a first section in the first image and pixel information of a second section in the second image, the first motion map indicating an estimated motion between the first section and the second section, wherein the first section and the second section both correspond to a part of a bright band in the respective images, and the first section and the second section both positionally correspond to third section in the third image, wherein the third section corresponds to a part of a dark band in the third image; determine the second motion map based on extrapolation of the first motion map, wherein the second motion map indicates an estimated motion between the first section and the third section, or an estimated motion between the second section and the third section; and generate a partially motion compensated image by applying the second motion map to the third section.

In these embodiment, the control unit may be further configured to: determine a bright band motion map for each of one or more sections in the base image which positionally corresponds to a part of a dark band in the base image and positionally corresponds to a part of a bright band in each of two images that are adjacent to the base image, wherein one of the two adjacent images is captured directly before or after the base image; determine, for each of the one or more bright band motion maps, an extrapolated motion map, wherein each of the extrapolated motion maps indicates an estimated motion between the respective section in the base image and the corresponding section in the image captured directly before or after the base image; and generate a first motion compensated image by applying the second motion map and the one or more extrapolated motion maps, wherein the first motion compensated image is associated with high states of the pulsed illumination.

In some embodiments, the control unit is further configured to: determine a dark band motion map for each of the one of more sections in the base image which positionally corresponds to a part of a bright band in the base image and positionally corresponds to a part of a dark band in at least one of two images that are adjacent to the base image, wherein one of the two images is captured directly before the base image and another one of the two images is captured directly after the base image; determine, for each of the one or more dark band motion maps, an extrapolated motion map, wherein each of the extrapolated motion maps indicates an estimated motion between the respective section in the base image and the corresponding section in the image captured directly before or after the base image; and generate a second motion compensated image by applying the one or more extrapolated motion maps, wherein the second motion compensated image is associated with low states of the pulsed illumination.

In some embodiments, the control unit may be configured to generate a first composite image by combining the plurality of bright bands in the first motion compensated image with estimated bright bands based on applying the one or more extrapolated motion maps associated with bright bands in the other images in the plurality of images, generate a second composite image by combining the plurality of dark bands in the second motion compensated image with estimated dark bands based on applying the one or more extrapolated motion maps associated with dark bands in the other images in the plurality of images, and generate an ambient light corrected image based on a difference in pixel information between the first composite image and the second composite image.

In a second aspect, there is provided a method for performing image motion compensation, the method comprising: providing pulsed illumination to an object; capturing, while the object is illuminated by the pulsed illumination from the light source, a plurality of images of the object, wherein the plurality of images comprises at least one first image, a second image, and a third image wherein the first and second images are captured by the imaging unit during an on-phase of the pulsed illumination from the light source, and the third image is captured by the imaging unit during an off-phase of the pulsed illumination from the light source; determining, based on pixel information of at least one section in the first image and pixel information of at least one corresponding section in the second image, a first motion map indicating an estimated motion between at least one section in the first image and at least the corresponding section in the second image; determining a second motion map by at least extrapolating or interpolating the first motion map, wherein the second motion map indicates an estimated motion between at least the section in the first image and at least one corresponding section in the third image, or an estimated motion between at least the corresponding section in the second image and at least one corresponding section in the third image; and generating an at least partially motion compensated image by applying the second motion map to at least the corresponding section in the third image.

In some embodiments, the first motion map may be determined based on pixel information on the first image and pixel information of the second image, the first motion map indicating an estimated motion between the first image and the second image. The second motion map may be determined based on the first motion map, and the second motion map indicates an estimated motion between the second image and the third image. The motion compensated image may be generated by applying the second motion map to the third image.

In some embodiments, the plurality of images may be captured such that the first to third images are captured in the sequence of: the first image, the second image, and the third image, or in the sequence of: the third image, the second image, and the first image, and the second motion map may be determined based on extrapolation of the first motion map, wherein the extrapolation of the first motion map comprises performing an additive inversion of the first motion map.

In some embodiments, the plurality of images may be captured such that the first to third images are captured in the sequence of: the first image, the third image, and the second image, and the second motion map may be determined based on performing an interpolation operation of first motion map.

In some embodiments, the plurality of images may further comprise a fourth image, and the plurality of images are captured such that the first to fourth images may be captured in the sequence of: the fourth image, the first image, the second image, and the third image. In these embodiments, the first image, the second image, and the fourth image may be captured during an on-phase of the pulsed illumination from the light source, and the third image may be captured during an off-phase of the pulsed illumination from the light source. Furthermore, in these embodiments the method may further comprise determining a third motion map indicating an estimated motion between the first image and the fourth image based on pixel information of the first image and pixel information of the fourth image. The first motion map may be determined based on pixel information of the first image and pixel information of the second image, and the first motion map indicating an estimated motion between the first image and the second image. The second motion map may be determined based on extrapolation of the first motion map and the third motion map, and the second motion map indicating an estimated motion between the second image and the third image. The motion compensated image may be generated by applying the second motion map to the third image.

According to the aspects and embodiments described above, the limitations of existing techniques are addressed. In particular, the above-described aspects and embodiments offer robust motion compensation techniques that are capable of handling large intensity changes. There is thus provided an improved system and method for performing image motion compensation. These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF THE EMBODIMENTS

As noted above, there is provided an improved method and a system which address the existing problems.

Figure 1:
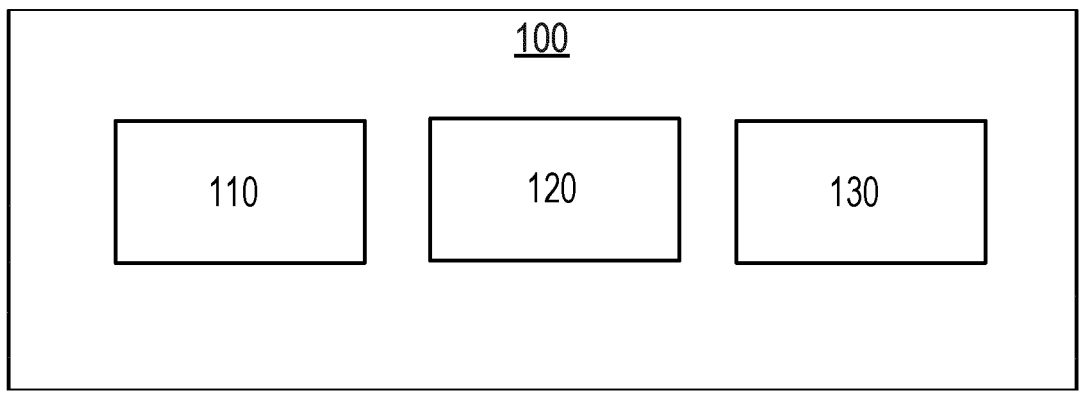
FIG. 1 is a block diagram of a system for performing image motion compensation according to an embodiment.

FIG. 1 shows a block diagram of a system 100 according to an embodiment, which can be used for performing image motion compensation. As illustrated in FIG. 1, the system 100 comprises a light source 110, an imaging unit 120, and a control unit 130.

The light source 110 is configured to provide pulsed illumination to an object. In some embodiments, the light source 110 may be the flash light of a camera (e.g. the imaging unit 120).

The imaging unit 120 is configured to capture, while the object is illuminated by the pulsed illumination from the light source 110, a plurality of images of the object. The plurality of images comprises at least a first image, a second image, and a third image. It will be understood that in the context of the present disclosure, since the plurality of images are captured while the object is illuminated by pulsed illumination, there may be instances where a captured image may correspond to an off-phase of the pulsed illumination and therefore in such instances the object may not be illuminated.

In some embodiments, the imaging unit 120 may be a rolling shutter camera configured to capture the plurality of images at an exposure time shorter than the wave period of the pulsed illumination, such that each of the plurality of captured images comprises a plurality of bright bands and dark bands. In this case, a bright band corresponds to a high state of the pulsed illumination and a dark band corresponds to a low state of the pulsed illumination.

The control unit 130 is configured to determine, based on pixel information of at least a section in the first image and pixel information of at least a corresponding section in the second image, a first motion map indicating an estimated motion between at least a section in the first image and at least the corresponding section in the second image.

Furthermore, the control unit 130 is configured to determine a second motion map by at least extrapolating or interpolating the first motion map. The second motion map indicates an estimated motion between at least the section in the first image and at least a corresponding section in the third image, or an estimated motion between at least the corresponding section in the second image and at least a corresponding section in the third image. Also, the control unit 130 is configured to generate an at least partially motion compensated image by applying the second motion map to at least the corresponding section in the third image.

In some embodiments, the first and second images may be captured by the imaging unit 120 during an on-phase of the pulsed illumination from the light source 110, and the third image may be captured by the imaging unit 120 during an off-phase of the pulsed illumination from the light source 110. In these embodiments, the control unit 130 may be configured to determine the first motion map indicating an estimated motion between the first image and the second image based on pixel information on the first image and pixel information of the second image, and to determine the second motion map based on the first motion map. In these embodiments, the second motion map may indicate an estimated motion between the second image and the third image. Moreover, the control unit 130 may be configured to generate the motion compensated image by applying the second motion map to the third image.

In these embodiments, the plurality of images may be captured such that the first to third images are captured in the sequence of: the first image, the second image, and the third image, or in the sequence of: the third image, the second image, and the first image. Based on this particular sequence, the second motion map may be determined based on extrapolation of the first motion map. The extrapolation of the first motion map may comprise performing an additive inversion of the first motion map.

Alternatively, in these embodiments the plurality may be captured such that the first to third images are captured in the sequence of: the first image, the third image, and the second image. Based on this particular sequence, the second motion map is determined based on interpolation of the first motion map.

In some embodiments, the plurality of images may further comprise a fourth image, and the plurality of images are captured such that the first to fourth images are captured in the sequence of: the fourth image, the first image, the second image, and the third image. Furthermore, the first image, the second image, and the fourth image may be captured during an on-phase of the pulsed illumination from the light source 110, and the third image may be captured during an off-phase of the pulsed illumination from the light source 110. In these embodiments, the control unit 130 may be configured to determine the first motion map indicating an estimated motion between the first image and the second image based on pixel information of the first image and pixel information of the second image, to determine a third motion map indicating an estimated motion between the first image and the fourth image based on pixel information of the first image and pixel information of the fourth image, to determine the second motion map indicating an estimated motion between the second image and the third image, based on extrapolation of the first motion map and the third motion map, and to generate the motion compensated image by applying the second motion map to the third image.

In some embodiments, the control unit 130 may be configured to generate an ambient light corrected image based on by performing a subtraction operation between pixel information corresponding to the at least partially motion compensated image and pixel information corresponding to the first image or the second image.

As mentioned above with reference to the imaging unit 120, the imaging unit 120 in some embodiments may be a rolling shutter camera configured to capture the plurality of images at an exposure time shorter than the wave period of the pulsed illumination, such that each of the plurality of captured images comprises a plurality of bright bands and dark bands. In this case, a bright band corresponds to a high state of the pulsed illumination and a dark band corresponds to a low state of the pulsed illumination. In these embodiments, the pulse frequency of the illumination provided by the light source 110 may be a value that is not a multiple integral of the frame rate at which the plurality of images are captured by the imaging unit 120. Furthermore, one of the first image and the second image may be captured directly before or after the third image.

In these embodiments, the control unit 130 may be configured to select the third image as a base image, and determine the first motion map based on pixel information of a first section in the first image and pixel information of a second section in the second image, the first motion map indicating an estimated motion between the first section and the second section. The first section and the second section may both correspond to a part of a bright band in the respective images. In addition, in these embodiments, the first section and the second section may both positionally correspond to third section in the third image, and the third section may correspond to a part of a dark band in the third image. The control unit 130 may be further configured to determine the second motion based on extrapolation of the first motion map, the second motion map indicating an estimated motion between the first section and the third section, or an estimated motion between the second section and the third section. Also, the control unit 130 may be configured to generate a partially motion compensated image by applying the second motion map to the third section.

In addition, in these embodiments, the control unit 130 may be further configured to determine a bright band motion map for each of one or more sections in the base image which positionally corresponds to a part of a dark band in the base image and positionally corresponds to a part of a bright band in each of two images that are adjacent to the base image. One of the two adjacent images may be captured directly before or after the base image. Also, the control unit 130 may be configured to determine, for each of the one or more bright band motion maps, an extrapolated motion map, each of the extrapolated motion maps indicating an estimated motion between the respective section in the base image and the corresponding section in the image captured directly before or after the base image. The control unit 130 may be further configured to generate a first motion compensated image by applying the second motion map and the one or more extrapolated motion maps to the base image, the first motion compensated image being associated with high states of the pulsed illumination.

In addition, in these embodiments the control unit 130 may be further configured to determine a dark band motion map for each of the one of more sections in the base image which positionally corresponds to a part of a bright band in the base image and positionally corresponds to a part of a dark band in at least one of two images that are adjacent to the base image. One of the two images may be captured directly before the base image and another one of the two images is captured directly after the base image. Also, the control unit 130 may be configured to determine, for each of the one or more dark band motion maps, an extrapolated motion map, each of the extrapolated motion maps indicating an estimated motion between the respective section in the base image and the corresponding section in the image captured directly before or after the base image. The control unit 130 may be further configured to generate a second motion compensated image by applying the one or more extrapolated motion maps, the second motion compensated image being associated with low states of the pulsed illumination.

In addition, in these embodiments, the control unit 130 may be further configured to generate a first composite image by combining the plurality of bright bands in the first motion compensated image with estimated bright bands based on applying the one or more extrapolated motion maps associated with bright bands in the other images in the plurality of images, generate a second composite image by combining the plurality of dark bands in the second motion compensated image with estimated dark bands based on applying the one or more extrapolated motion maps associated with dark bands in the other images in the plurality of images, and generate an ambient light corrected image based on a difference in pixel information between the first composite image and the second composite image.

In general, the control unit 130 controls the operation of the system 100 and can implement the method described herein. The control unit 130 can comprise one or more processors, processing units, multi-core processor or modules that are configured or programmed to control the system 100 in the manner described herein. In particular implementations, the control unit 130 can comprise a plurality of software and/or hardware modules that are each configured to perform, or are for performing, individual or multiple steps of the method described herein.

In some embodiments, the system 100 may further comprise at least one user interface. Alternative or in addition, at least one user interface may be external to (i.e. separate to or remote from) the system 100. For example, at least one user interface may be part of another device. A user interface may be for use in providing a user of the system 100 with information resulting from the method described herein. Alternatively or in addition, a user interface may be configured to receive a user input. For example, a user interface may allow a user of the system 100 to manually enter instructions, data, or information. In these embodiments, the control unit 130 may be configured to acquire the user input from one or more user interfaces.

A user interface may be any user interface that enables the rendering (or output or display) of information to a user of the system 100. Alternatively or in addition, a user interface may be any user interface that enables a user of the system 100 to provide a user input, interact with and/or control the system 100. For example, the user interface may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, the system 100 may comprise a memory. Alternatively or in addition, one or more memories may be external to (i.e. separate to or remote from) the system 100. For example, one or more memories may be part of another device. A memory can be configured to store program code that can be executed by the control unit 130 to perform the method described herein. A memory can be used to store information, data, signals and measurements acquired or made by the control unit 130 of the system 100. For example, a memory may be used to store (for example, in a local file) the at least partially motion compensated image generated by the control unit 130. The control unit 130 may be configured to control a memory to store the at least partially motion compensated image generated by the control unit 130.

In some embodiments, the system 100 may comprise a communications interface (or circuitry) for enabling the system 100 to communicate with any interfaces, memories and/or devices that are internal or external to the system 100. The communications interface may communicate with any interfaces, memories and/or devices wirelessly or via a wired connection. For example, the communications interface may communicate with one or more user interfaces wirelessly or via a wired connection. Similarly, the communications interface may communicate with the one or more memories 106 wirelessly or via a wired connection.

It will be appreciated that FIG. 1 only shows the components required to illustrate an aspect of the system 100 and, in a practical implementation, the system 100 may comprise alternative or additional components to those shown.

Figure 2:
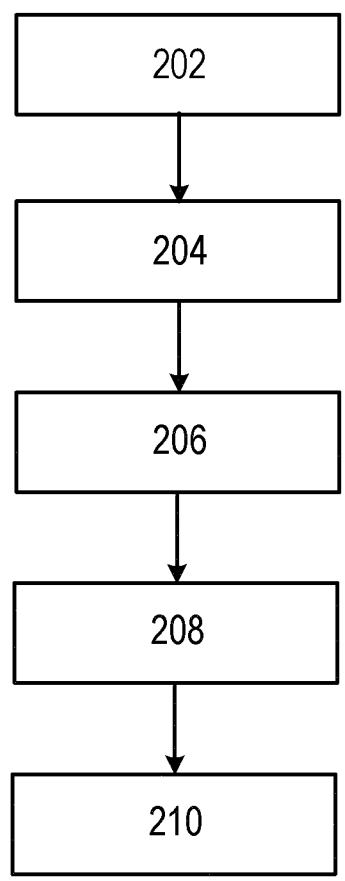
FIG. 2 illustrates a method for performing image motion compensation according to an embodiment.

FIG. 2 illustrates a method for performing image motion compensation according to an embodiment. The illustrated method can generally be performed by the system 100 as described with reference to FIG. 1, in particular by or under the control of control unit 130 of the system 100. For the purpose of illustration, at least some of the blocks of FIG. 2 will be described with reference to the various components of the system 100 of FIG. 1.

With reference to FIG. 2, at block 202, pulsed illumination is provided to an object. Specifically, pulsed illumination may be provided to an object by the light source 110 of the system 100.

Subsequently, at block 204, while the object is illuminated by the pulsed illumination from the light source, a plurality of images of the object are captured, the plurality of captured images comprising at least a first image, a second image, and a third image. Specifically, the plurality of images may be captured by the imaging unit 120 of the system 100. It will be understood that in the context of the present disclosure, since the plurality of images are captured while the object is illuminated by pulsed illumination, there may be instances where a captured image may correspond to an off-phase of the pulsed illumination and therefore in such instances the object may not be illuminated.

Returning to FIG. 2, at block 206, a first motion map indicating an estimated motion between at least a section in the first image and at least the corresponding section in the second image is determined based on pixel information of at least a section in the first image and pixel information of at least a corresponding section in the second image. Specifically, the first motion map may be determined by the control unit 130 of the system 100.

Returning to FIG. 2, at block 208, a second motion map indicating an estimated motion between at least the section in the first image and at least a corresponding section in the third image, or an estimated motion between at least the corresponding section in the second image and at least a corresponding section in the third image, is determined by at least extrapolating or interpolating the first motion map. Specifically, the second motion map may be determined by the control unit 130 of the system 100.

Returning to FIG. 2, at block 210, an at least partially motion compensated image is generated by applying the second motion map to at least the corresponding section in the third image. Specifically, the at least partially motion compensated image may be generated by the control unit 130 of the system 100.

Although not shown in FIG. 2, in some embodiments the method may further comprise generating an ambient light corrected image by performing a subtraction operation between pixel information corresponding to the at least partially motion compensated image and pixel information corresponding to the first image or the second image.

In some embodiments, at block 204 the first and second images may be captured during an on-phase of the pulsed illumination, and the third image may be captured during an off-phase of the pulsed illumination. In these embodiments, at block 206 the first motion map indicating an estimated motion between the first image and the second image may be determined based on pixel information on the first image and pixel information of the second image. Also, in these embodiments at block 208 the second motion map may be determined based on the first motion map, the second motion map indicating an estimated motion between the second image and the third image. Furthermore, in these embodiment at block 210 the motion compensated image may be generated by applying the second motion map to the third image.

In these embodiments, at block 204 the plurality of images may be captured such that the first to third images are captured in the sequence of: the first image, the second image, and the third image, or in the sequence of: the third image, the second image, and the first image. Subsequently, at block 208 the second motion map may be determined based on extrapolation of the first motion map. The extrapolation of the first motion map may comprise performing an additive inversion of the first motion map.

Alternatively, in these embodiments at block 204 the plurality of images may be captured such that the first to third images are captured in the sequence of: the first image, the third image, and the second image. Subsequently, at block 208 the second motion map may be determined based on interpolation of the first motion map.

In some embodiments, the plurality of images captured at block 204 may further comprise a fourth image, at block 206 the plurality of images may be captured such that the first to fourth images are captured in the sequence of: the fourth image, the first image, the second image, and the third image, and the first image, the second image. The fourth image may be captured during an on-phase of the pulsed illumination, and the third image may be captured during an off-phase of the pulsed illumination. In these embodiments, at block 206 the first motion map indicating an estimated motion between the first image and the second image based on pixel information of the first image and pixel information of the second image. Furthermore, in these embodiments the method may further comprise determining a third motion map indicating an estimated motion between the first image and the fourth image based on pixel information of the first image and pixel information of the fourth image. In addition, at block 208 the second motion map indicating an estimated motion between the second image and the third image may be determined based on extrapolation of the first motion map and the third motion map. Subsequently, at block 210, the motion compensated image may be generated by applying the second motion map to the third image.

In some embodiments, at block 204 the plurality of images may be captured at an exposure time shorter than the wave period of the pulsed illumination provided at block 202, such that each of the plurality of images comprises a plurality of bright bands and dark bands. A bright band corresponds to a high state of the pulsed illumination and a dark band corresponds to a low state of the pulsed illumination. In these embodiments, the illumination provided at block 202 may have a pulse frequency that is not a multiple integral of the frame rate at which the plurality of images are captured, and at block 204 one of the first image and the second image may be captured directly before or after the third image. In these embodiments, the method may further comprise selecting the third image as a base image.

Furthermore, in these embodiments at block 206 the first motion map may be determined based on pixel information of a first section in the first image and pixel information of a second section in the second image, the first motion map indicating an estimated motion between the first section and the second section. The first section and the second section both correspond to a part of a bright band in the respective images, the first section and the second section both positionally correspond to third section in the third image, and the third section corresponds to a part of a dark band in the third image. Subsequently, at block 208 the second motion map may be determined based on extrapolation of the first motion map, the second motion map indicating an estimated motion between the first section and the third section, or an estimated motion between the second section and the third section. In these embodiments, at block 210 a partially motion compensated image may be generated by applying the second motion map to the third section.

Furthermore, in these embodiments the method may further comprise determining a bright band motion map for each of one or more sections in the base image which positionally corresponds to a part of a dark band in the base image and positionally corresponds to a part of a bright band in each of two images that are adjacent to the base image, one of the two adjacent images being captured directly before or after the base image, and determining, for each of the one or more bright band motion maps, an extrapolated motion map, each of the extrapolated motion maps indicating an estimated motion between the respective section in the base image and the corresponding section in the image captured directly before or after the base image. Subsequently, the method may comprise generating a first motion compensated image by applying the second motion map and the one or more extrapolated motion maps, the first motion compensated image being associated with high states of the pulsed illumination.

Furthermore, in these embodiments the method may further comprise determining a dark band motion map for each of the one of more sections in the base image which positionally corresponds to a part of a bright band in the base image and positionally corresponds to a part of a dark band in at least one of two images that are adjacent to the base image, one of the two images being captured directly before the base image and another one of the two images is captured directly after the base image, and determining, for each of the one or more dark band motion maps, an interpolated motion map, each of the interpolated motion maps indicating an estimated motion between the respective section in the base image and the corresponding section in the image captured directly before or after the base image. Subsequently, the method may comprise generating a second motion compensated image by applying the one or more interpolated maps, wherein the second motion compensated image is associated with low states of the pulsed illumination.

Furthermore, in these embodiments the method may further comprise generating a first composite image by combining the plurality of bright bands in the first motion compensated image with estimated bright bands based on applying the one or more extrapolated motion maps associated with bright bands in the other images in the plurality of images, generating a second composite image by combining the plurality of dark bands in the second motion compensated image with estimated dark bands based on applying the one or more extrapolated motion maps associated with dark bands in the other images in the plurality of images, and generating an ambient light corrected image based on a difference in pixel information between the first composite image and the second composite image.

Figure 3:
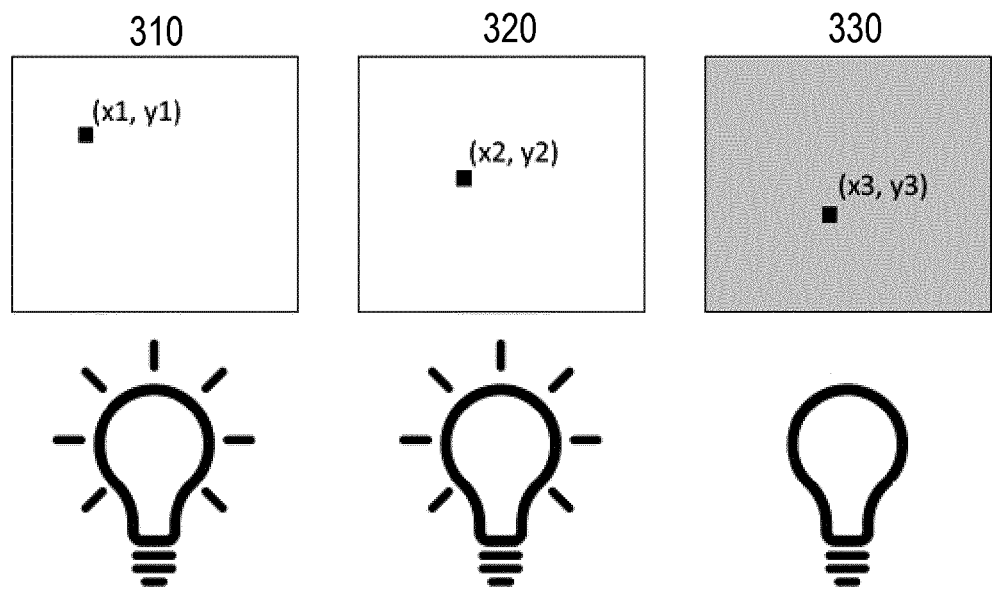
FIG. 3 shows a plurality of images captured while an object is illuminated by pulsed illumination, according to an embodiment.

FIG. 3 shows a plurality of images captured while an object is illuminated by pulsed illumination, according to an embodiment. In the present embodiment, the plurality of images comprises two on-phase images and an off-phase image. The two on-phase images are captured during on-phases of the pulsed illumination and the off-phase image is captured during an off-phase of the pulsed illumination. Whether an image illustrated in FIG. 3 is "on-phase" or "off-phase" is represented by a bulb symbol adjacent to the respective image. In more detail, a "switched-on" light bulb indicates that the respective image is captured during an on-phase of the pulsed illumination, and a "switched-off" light bulb indicates that the respective image is captured during an off-phase of the pulsed illumination. Therefore, in this embodiment, the first image 310 and the second image 320 are captured during on-phases of the pulsed illumination while the third image 330 is captured during an off-phase of the pulsed illumination. Moreover, in this embodiment, the first to third images 310, 320, 330 are captured sequentially and consecutively.

Since the first image 310 and the second image 320 are both captured during an on-phase of the pulsed illumination, a first motion map can be determined between the first image 310 and the second image 320. In this case, the first motion map is determined based on pixel information of the first image 310 and the second image 320, the first motion map indicating an estimated motion between the first image 310 and the second image 320. Furthermore, by extrapolating the first motion map, a second motion map can be determined, where the second motion map indicates an estimated motion between the second image 320 and the third image 330. Once the second motion map is determined, it can be applied to the third image 330 to generate a motion compensated image, the motion compensated image being equivalent to the third image 330 that is motion compensated with respect to the second image 320.

To explain in more detail, an arbitrary pixel is labelled in each of the first image 310, the second image 320, and the third image 330 respectively as (x1, y1), (x2, y2), and (x3, y3). Typically, by using motion estimation algorithm(s) the motion of pixels in images can be tracked under constant lighting conditions. Therefore, the displacement required for the pixel (x1, y1) in the first image 310 to arrive at the location of the pixel (x2, y2) in the second image 320 can be determined using such motion estimation algorithms. However, under changing lighting conditions, as is the case between the second image 320 and the third image 330 ("on-phase" to "off-phase"), motion estimation algorithms typically do not perform well in determining the displacement for the pixel (x2, y2) in the second image 320. Hence, in order to perform motion compensation, the motion map between the first image 310 and the second image 320 can be extrapolated to generate a motion map between the second image 320 and the third image 330.

In the embodiments discussed in the present disclosure, motion maps can be defined as Mx[y,x] and $M_y$[y,x], where the displacement in the x-direction being expressed as a function of y and x, and the displacement in the y-direction being expressed as a function of y and x respectively. In the present embodiment, the motion compensation of the second image 320 with respect to the first image 310 involves a resampling operation based on pixel values F (which may be grayscale pixels or RGB triplets), the resampling operation being represented by the formula:

$$F'_1[y,x]=F_1[y-M_{1\to 2,y}[y,x], x-M_{1\to 2,x}[y,x]] \quad (1)$$

In this case, under ideal circumstances, the motion map at (x2, y2) of the second image 320 can be expressed using the formulae below:

$$M_{1\to 2,x}[y2,x2]=x2-x1 \quad (2)$$

$$M_{1\to 2,y}[y2,x2]=y2-y1 \quad (3)$$

In order to perform motion compensation of the third image 330 with respect to the second image 320, a resampling operation can be used, where the resampling operation is represented by formula (4) below:

$$F'_3[y,x]=F_3[y-M_{3\to 2,y}[y,x], x-M_{3\to 2,x}[y,x]] \quad (4)$$

Based on the above formulae, it follows that:

$$F'_3[y2,x2]=F_3[y3,x3] \quad (5)$$

Or:

$$y3=y2-M_{3\to 2,y}[y2,x2] \quad (6)$$

$$x3=x2-M_{3\to 2,x}[y2,x2] \quad (7)$$

$$M_{3\to 2,y}[y2,x2]=y2-y3 \quad (8)$$

$$M_{3\to 2,x}[y2,x2]=x2-x3 \quad (9)$$

By extrapolating based on the above formulae, the following formulae can be derived. It is noted that in the context of the present disclosure, the extrapolation is performed based on the assumption that the motion between the first image 310 and the second image 320 is the same as the motion between the second image 320 and the third image 330. This is because typically the speed of the motion is slower than the image frame rate that the linear extrapolation or interpolation holds.

$$M_{3\to 2,y}[y2,x2]=y1-y2=-M_{1\to 2,y}[y2,x2] \quad (10)$$

$$M_{3\to 2,x}[y2,x2]=x1-x2=-M_{1\to 2,x}[y2,x2] \quad (11)$$

Therefore, by determining the motion map $M_{1\to 2}$, the required extrapolated motion map $M_{3\to 2}$ can simply be constructed by performing additive inversion or linear extrapolation. Furthermore, based on the third image 330 that is motion compensated with respect to the second image 320, an ambient light corrected image can be constructed simply by performing a subtraction operation as represented by the formula: $F_{artificial}[y, x]=F_2[y, x]-F'_3[y, x]$, where $F_{artificial}$ is representative of the pixels of the ambient light corrected image. In some embodiments, more advanced schemes for ambient light correction may be used.

Figure 4:
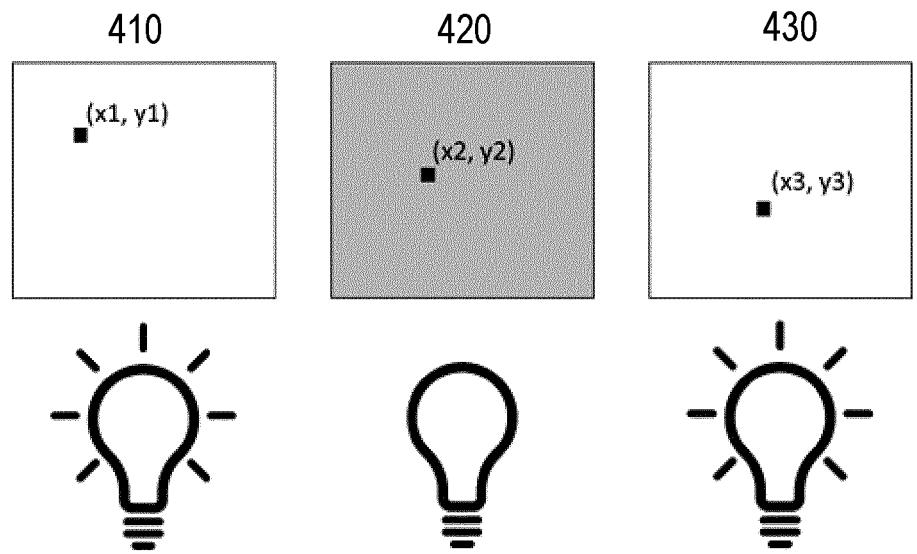
FIG. 4 shows a plurality of images captured while an object is illuminated by pulsed illumination, according to another embodiment.

FIG. 4 shows a plurality of images captured while an object is illuminated by pulsed illumination, according to another embodiment. In the present embodiment, the plurality of images comprises two on-phase images and an off-phase image. The two on-phase images are captured during on-phases of the pulsed illumination and the off-phase image is captured during an off-phase of the pulsed illumination. Similar to FIG. 3, whether an image illustrated in FIG. 4 is "on-phase" or "off-phase" is represented by a bulb symbol adjacent to the respective image. In more detail, a "switched-on" light bulb indicates that the respective image is captured during an on-phase of the pulsed illumination, and a "switched-off" light bulb indicates that the respective image is captured during an off-phase of the pulsed illumination. Therefore, in this embodiment, the first image 410 and the third image 430 are captured during on-phases of the pulsed illumination while the second image 420 is captured during an off-phase of the pulsed illumination. Moreover, in this embodiment, the first to third images 410, 420, 430 are captured sequentially and consecutively.

Since the first image 410 and the third image 430 are both captured during an on-phase of the pulsed illumination, a first motion map can be determined between the first image 410 and the third image 430. In this case, the first motion map is determined based on pixel information of the first image 410 and the third image 420, the first motion map indicating an estimated motion between the first image 410 and the second image 420. Furthermore, by interpolating the first motion map, a second motion map can be determined, where the second motion map indicates an estimated motion between the second image 420 and the third image 430 or an estimated motion between the first image 310 and the second image 420. Essentially, in this embodiment, since the second image 420 is between the first image 410 and the third image 430, the second motion map is equivalent to half of the first motion map. Once the second motion map is determined, it can be applied to the second image 420 to generate a motion compensated image, the motion compensated image being equivalent to the second image 330 that is motion compensated with respect to the first image 410 or the third image 430.

Figure 5:
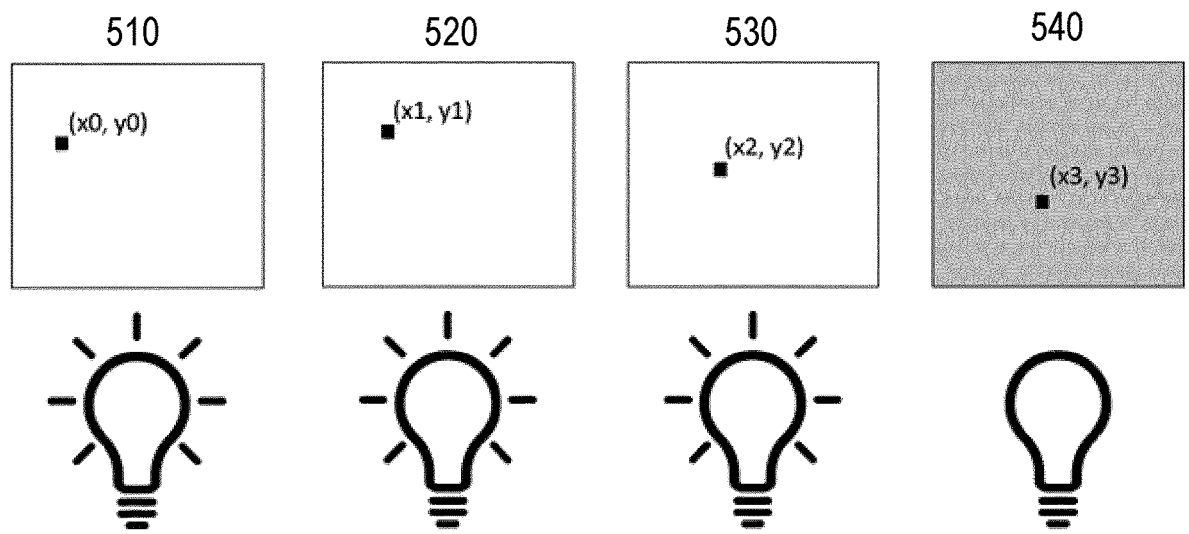
FIG. 5 shows a plurality of images captured while an object is illuminated by pulsed illumination, according to yet another embodiment.

FIG. 5 shows a plurality of images captured while an object is illuminated by pulsed illumination, according to yet another embodiment. In the present embodiment, the plurality of images comprises three on-phase images and an off-phase image. The three on-phase images are captured during on-phases of the pulsed illumination and the off-phase image is captured during an off-phase of the pulsed illumination. Whether an image illustrated in FIG. 5 is "on-phase" or "off-phase" is represented by a bulb symbol adjacent to the respective image. In more detail, a "switched-on" light bulb indicates that the respective image is captured during an on-phase of the pulsed illumination, and a "switched-off" light bulb indicates that the respective image is captured during an off-phase of the pulsed illumination. Therefore, in this embodiment, the first image 510, the second image 520, and the third image 530 are captured during on-phases of the pulsed illumination while the fourth image 540 is captured during an off-phase of the pulsed illumination. Moreover, in this embodiment, the first to fourth images 510, 520, 530, and 540 are captured sequentially and consecutively.

Since the first, second, and third image 510, 520, 530 are all captured during an on-phase of the pulsed illumination, a first motion map can be determined between the first image 510 and the second image 520 and a second motion map can be determined between the second image 520 and the third image 530. In this case, the first motion map is determined based on pixel information of the first image 510 and the second image 520, the first motion map indicating an estimated motion between the first image 510 and the second image 520. Also, the second motion map is determined based on pixel information of the second image 520 and the third image 530, the second motion map indicating an estimated motion between the second image 520 and the third image 530. Furthermore, by performing approximation based on the first motion map and the second motion map, a third motion map can be determined, where the third motion map indicates an estimated motion between the third image 530 and the fourth image 540. Once the third motion map is determined, it can be applied to the fourth image 540 to generate a motion compensated image, the motion compensated image being equivalent to the fourth image 540 that is motion compensated with respect to the third image 530. In the present embodiment, an arbitrary pixel is labelled in each of the first image 510, the second image 520, the third image 530, and the fourth image 540 respectively as (x0, y0), (x1, y1), (x2, y2), and (x3, y3).

In this case, in order to generate an ambient light corrected image, the motion map between the third image 530 and the fourth image 540 (in the direction from the fourth image 540 to the third image 530), represented by $M_{4\to 3}[y, x]$, is to be determined. Also, the motion maps between the first image 510 and the second image 520, between the second image 520 and the third image 530, and between the third image 530 and the fourth image 540 (in the direction from the third image 530 to the fourth image 540) are respectively represented by $M_{1\to 2}[y,x]$, $M_{2\to 3}[y,x]$, and $M_{3\to 4}[y,x]$.

The pixel coordinates of the plurality of images in the present embodiment can be expressed as second order polynomials, using the formulae below:

$$x3 = ax^2 + bx + c \quad (12)$$

$$y3 = dy^3 + ey + f \quad (13)$$

It can also been shown that in this case:

$$y3 - y2 = 2(y2 - y1) - (y1 - y0) \quad (14)$$

$$x3 - x2 = 2(x2 - x1) - (x1 - x0) \quad (15)$$

Hence, it can be derived that:

$$M_{4\to 3,x}[y2, x2] = -(x3 - x2) = -2(x2 - x1) + (x1 - x0) \quad (16)$$

$$M_{4\to 3,y}[y2, x2] = -(y3 - y2) = -2(y2 - y1) + (y1 - y0) \quad (17)$$

Or, in terms of the motion maps:

$$M_{4\to 3,x}[y2, x2] = -2M_{2\to 3,x}[y2, x2] + M_{1\to 2,x}[y1, x1] \quad (18)$$

$$M_{4\to 3,y}[y2, x2] = -2M_{2\to 3,y}[y2, x2] + M_{1\to 2,y}[y1, x1] \quad (19)$$

This means that the motion map $M_{4\to 3}$ can be expressed as a function of the motion maps $M_{2\to 3}$ and $M_{1\to 2}$. However, for correct application, the motion map $M_{1\to 2}$ would need to be remapped to follow the coordinate system. Since the motion maps are generally not invertible, a sufficient approximation of the motion maps can be expressed as follows:

$$M_{4\to 3,x}[y, x] = -2M_{2\to 3,x}[y, x] + M_{1\to 2,x}[y, x] \quad (20)$$

$$M_{4\to 3,y}[y, x] = -2M_{2\to 3,y}[y, x] + M_{1\to 2,y}[y, x] \quad (21)$$

Based on formulae (20) and (21) as outlined above, it can be understood that by determining the motion map which indicates an estimated motion between the second image 520 and the third image 530, and the motion map which indicates an estimated motion between the first image 510 and the second image 520, a motion map which indicates an estimated motion between the third image 530 and the fourth image 540 (in the direction from the fourth image 540 to the third image 530) can be determined by approximation. Once the motion map indicating an estimated motion between the third image 530 and the fourth image 540 is determined, it can be applied to the fourth image 540 to generate a motion compensated image, the motion compensated image being equivalent to the fourth image 540 that is motion compensated with respect to the third image 530.

FIG. 6A to FIG. 6K illustrate the construction of a motion compensated image based on a plurality of images captured at an exposure time shorter than the wave period of the pulsed illumination. Since the plurality of images (including the first image 610, the second image 620, the third image 630, the fourth image 640, the fifth image 650, the sixth image 660, the seventh image 670, and the eighth image 680) are captured at an exposure time shorter than the wave period of the pulsed illumination, each of the plurality of images comprises a plurality of bright bands and dark bands. This is illustrated in FIG. 5A, which shows the plurality of images before motion compensation and ambient light correction. Also, in the present embodiment, the pulse frequency of the illumination is not a multiple integral of the frame rate at which the plurality of images are captured, which improves the contrast between the bright bands and the dark bands in each of the plurality of images. Specifically, in the present embodiment, the pulse frequency is approximately 2.5× of the frame rate at which the plurality of images are captured. In the present context, a bright band corresponds to a high state of the pulsed illumination, and a dark band corresponds to a low state of the pulsed illumination. Moreover, in this embodiment, the first to eighth images 610, 620, 630, 640, 650, 660, 670, and 680 are captured sequentially and consecutively.

Although the bright bands and dark bands are represented as regular shapes in the plurality of images in FIG. 6A to FIG. 6K, it will be appreciated that the illustration in these drawings have been simplified for facilitating understanding of the embodiments. In practical implementations, the bright bands and the dark bands may adopt trapezoidal shapes rather than rectangular shapes.

In the present embodiment, in order to achieve ambient light correction, two composite images are required. In more detail, there needs to be a first composite image which contains only bright bands (i.e. a combination of original bright bands in an image and estimated bright bands to replace original dark bands), and a second composite image which contains only dark bands (i.e. a combination of original dark bands in an image and estimated dark bands to replace original bright bands).

FIGS. 6B to 6E illustrate how the first composite image can be generated based on bright bands from the plurality of images. In the present embodiment, the fourth image 640 is selected as a base image, which is used as basis for generating the composite images.

Figure 6A:
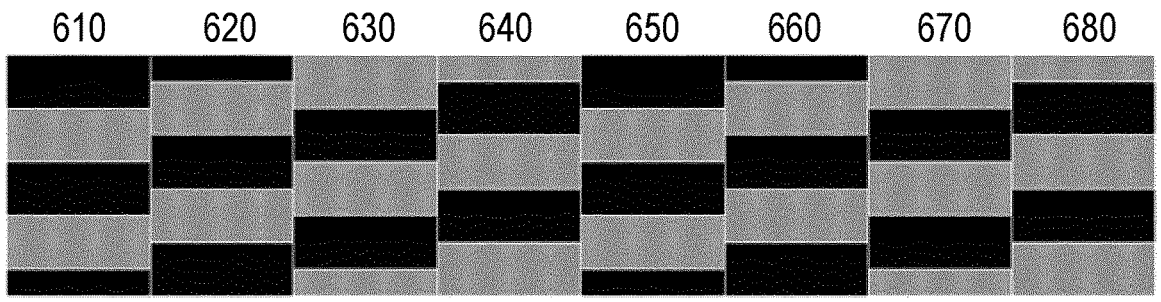
FIG. 6A to FIG. 6K illustrate the construction of a motion compensated image based on a plurality of images captured at an exposure time shorter than the wave period of the pulsed illumination.
Figure 6B:
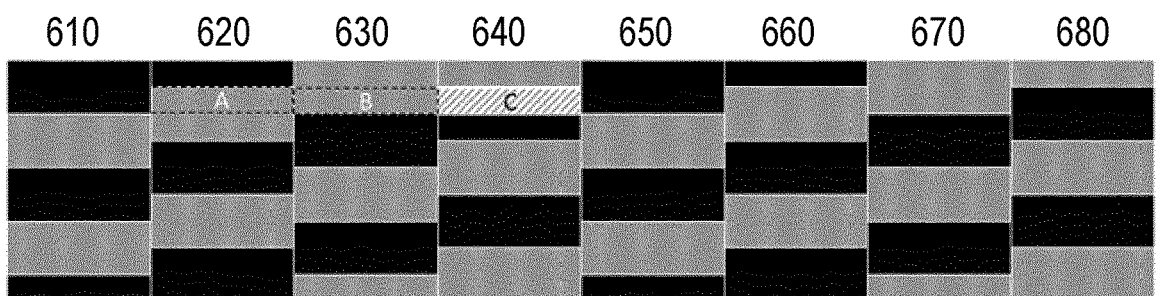

In FIG. 6B, a motion map between a section in the second image 620 (labelled "A" in FIG. 6B) and a corresponding section (labelled "B" in FIG. 6B) in the third image 630 is determined, the motion map being determined based on pixel information in the respective sections. The two sections in the second image 620 and the third image 630 each correspond to at least a part of a bright band in the respective image, and also the two sections both positionally correspond to at least a part of a dark band in the fourth image 640 (i.e. the selected base image in the present embodiment). Furthermore, the two sections positionally correspond to each other. The determined motion map indicates an estimated motion between the two sections in the second image 620 and the third image 630. By extrapolating this motion map between the corresponding sections in the second image 620 and the third image 630 (i.e. between sections "A" and "B" in FIG. 6B), a motion map which indicates an estimated motion between the corresponding sections in the third image 630 and the fourth image 640 (i.e. between sections "B" and "C in FIG. 6B) can be determined. Furthermore, by applying the motion map which indicates an estimated motion between the corresponding sections in the third image 630 and the fourth image 640 to the relevant section in the third image 630, i.e. section "B" in FIG. 6B, a partially motion compensated image can be generated (where the fourth image 640 is partially motion compensated in section "C" in FIG. 6B) and a positionally corresponding bright band can be estimated for the fourth image 640.

Figure 6C:
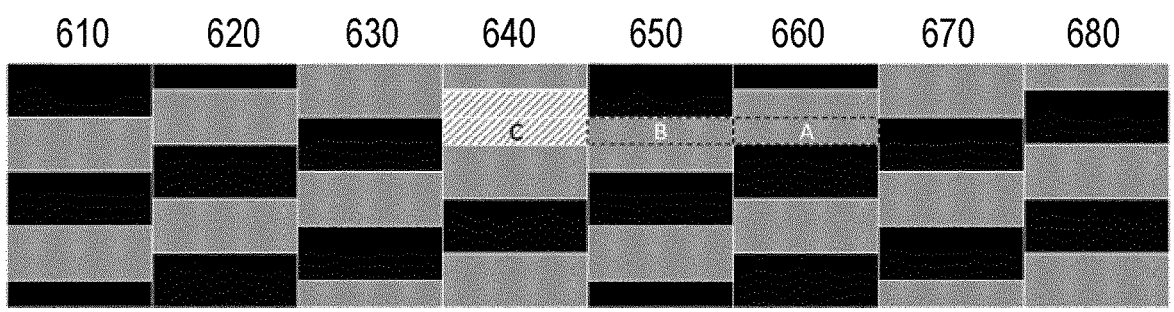
Figure 6D:
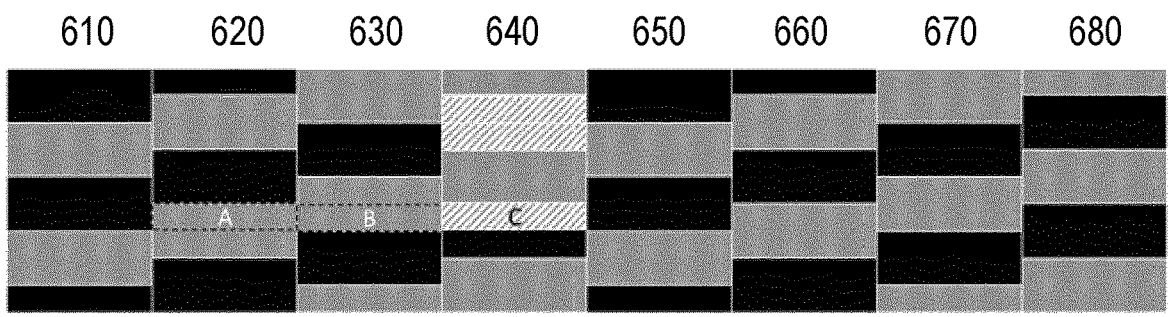
Figure 6E:
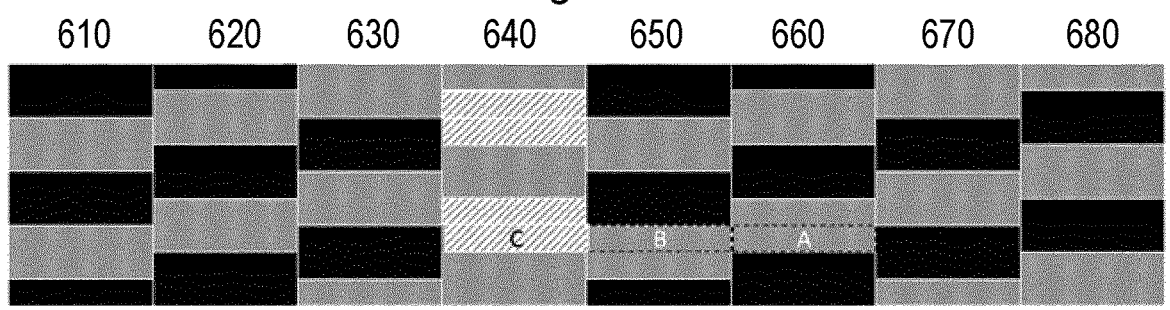

Similar operations can be applied to other areas corresponding to dark bands in the fourth image 640, as demonstrated in FIG. 6C, FIG. 6D, and FIG. 6E. In more detail, in each of these cases, a motion map is determined between section A and section B (as labelled in each of FIGS. 6C, 6D, and 6E) based on the pixel information associated with these respective sections, the motion map indicating an estimated motion between sections A and B. These motion maps will be referred in herein as "A-B motion maps". In FIGS. 6C, 6D, and 6E, each of the sections A and B correspond to at least a part of a bright band in the respective image, and the sections A and B both positionally correspond to at least a part of a dark band in the fourth image 640 (i.e. the selected base image in the present embodiment). Furthermore, the sections A and B positionally correspond to each other. By extrapolating each of the A-B motion maps, a respective motion map indicating an estimated motion between sections B and C can be determined in each case. These motion maps will be referred herein as "B-C motion maps". Subsequently, by applying a respective B-C motion map to a corresponding section B in the fourth image 640, the relevant section C of the fourth image 640 can be compensated for motion and a respective positionally corresponding bright band can be estimated for the fourth image 640.

The first composite image can then be generated by combining the plurality of bright bands in the motion compensated image (i.e. the bright bands in the original fourth image 640 as shown in FIG. 6A) with estimated bright bands based on the application of determined motion maps. This is illustrated in FIG. 6E in which areas corresponding to dark bands in the original fourth image 640 is now replaced with positionally-corresponding bright bands from other images (e.g. from the third image 630 or the fifth image 650).

FIGS. 6F to 6J illustrate how the second composite image can be generated based on applying the motion in bright bands to the dark bands from the plurality of images. As mentioned above, the fourth image 640 is selected as a base image.

Figure 6F:
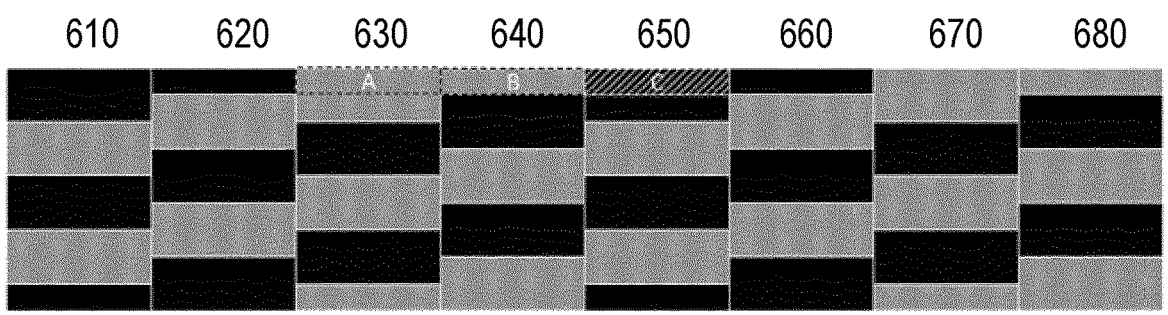
Figure 6G:
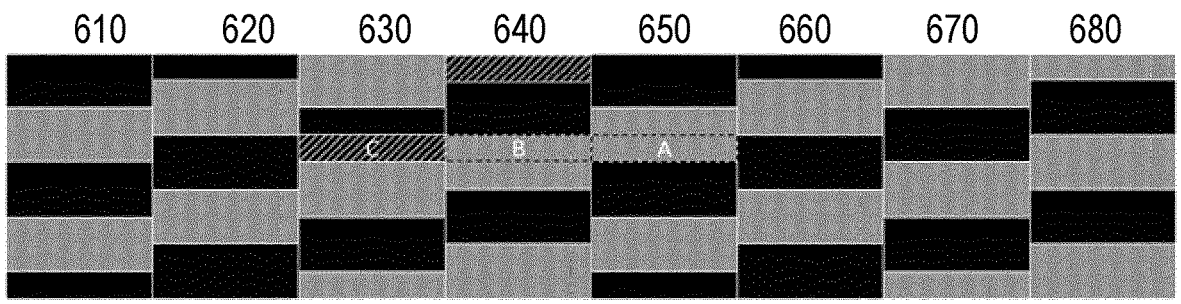
Figure 6H:
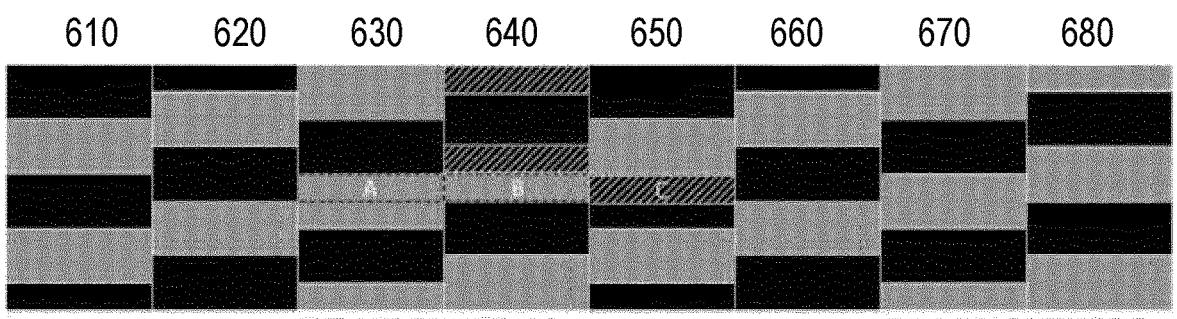
Figure 6I:
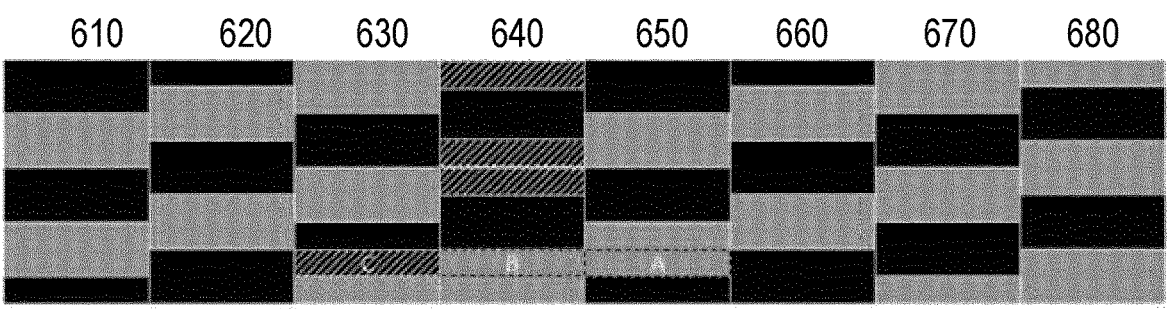
Figure 6J:
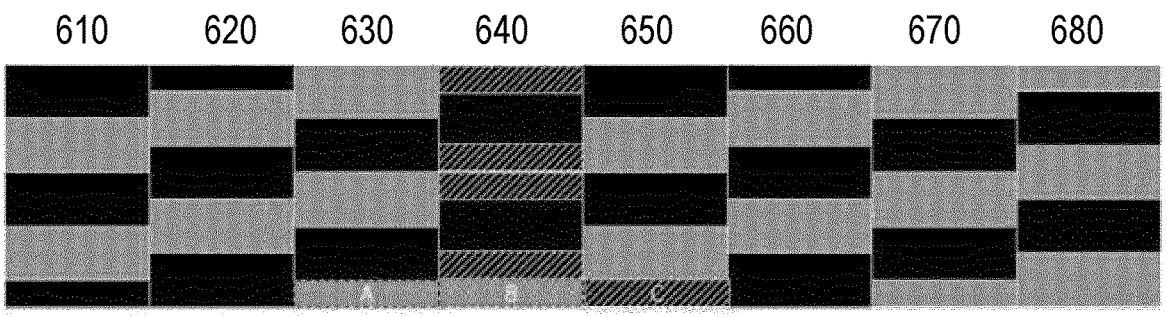

In FIG. 6F, a motion map between a section in the fourth image 640 (labelled "B" in FIG. 6F) and a corresponding section (labelled "A" in FIG. 6F) in the third image 630 is determined, the motion map being determined based on pixel information in the respective sections. The two sections in the third image 630 and the fourth image 640 each correspond to at least a part of a bright band in the respective image, and also the two sections both positionally correspond to at least a part of a dark band in the fifth image 650. Also, the two sections both positionally correspond to at least a part of a dark band in the fifth image 650 (labelled "C" in FIG. 6F). Furthermore, the two sections positionally correspond to each other. The determined motion map indicates an estimated motion between the two sections in the fourth image 640 and the third image 630. By extrapolating this motion map between the corresponding sections in the fourth image 640 and the third image 630 (i.e. between sections "B" and "A" in FIG. 6F), a motion map which indicates an estimated motion between the corresponding sections in the fifth image 650 and the fourth image 640 (i.e. between sections "C" and "B in FIG. 6F) can be determined. Furthermore, by applying the motion map which indicates an estimated motion between the corresponding sections in the fifth image 650 and the fourth image 640 to the relevant section in the fifth image 650, i.e. section "C" in FIG. 6F, a partially motion compensated dark image can be generated (where the fourth image 640 is partially motion compensated in section "B" in FIG. 6F).

Similar operations can be applied to other areas corresponding to bright bands in the fourth image 640, as demonstrated in FIG. 6G, FIG. 6H, FIG. 6I, and FIG. 6J. In more detail, in each of these cases, a motion map is determined between section B and section A (as labelled in each of FIGS. 6G, 6H, 6I, and 6J) based on the pixel information associated with these respective sections, the motion map indicating an estimated motion between sections B and A. These motion maps will be referred in herein as "B-A motion maps". In FIGS. 6G, 6H, 6I, and 6J, each of the sections A correspond to at least a part of a bright band in the respective image, each of the sections C correspond to at least a part of dark band in the respective image, and the sections A and C both positionally correspond to at least a part of a bright band in the fourth image 640 (i.e. the selected base image in the present embodiment). Furthermore, the sections A and C positionally correspond to each other. By interpolating each of the B-A motion maps, a respective motion map indicating an estimated motion between sections C and B can be determined in each case. These motion maps will be referred herein as "C-B motion maps". Subsequently, by applying a respective C-B motion map to a corresponding section C in the fifth image 650 (FIGS. 6F, 6H, 6J) or the third image 630 (FIGS. 6G, 6I, 6K), the relevant section B of the fourth image 640 can be compensated for motion.

Figure 6K:
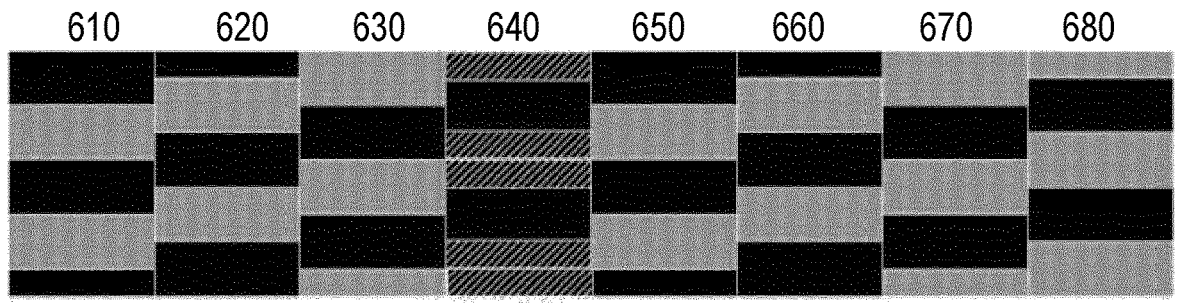

The second composite image can then be generated by combining the plurality of dark bands in motion compensated image (i.e. the dark bands in the original fourth image 640 as shown in FIG. 6A) with estimated dark bands based on the application of determined motion maps. This is illustrated in FIG. 6K in which areas corresponding to bright bands in the original fourth image 640 is now replaced with positionally-corresponding dark bands from other images (e.g. from the third image 630 or the fifth image 650).

Subsequent to the generation of the first and second composite images, an ambient light corrected image can be generated based on a difference in pixel information between the first composite image and the second composite image.

It will be appreciated that depending on a number of factors, including frame rate at which images are captured, flicker rate, and exposure time, etc., in alternative embodiments the exact strategy employed for performing motion compensation and/or ambient light correction may be adapted accordingly.

There is thus provided an improved system for performing image motion compensation and method for performing image motion compensation, which overcome the existing problems.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A system for performing image motion compensation, the system comprising:
    a light source configured to provide pulsed illumination to an object;
    an imaging unit configured to capture, while the object is illuminated by the pulsed illumination from the light source, a plurality of images of the object, wherein the plurality of images comprises at least a first image, a second image, and a third image,
    wherein the first and second images are captured by the imaging unit during an on-phase of the pulsed illumination from the light source, and the third image is captured by the imaging unit during an off-phase of the pulsed illumination from the light source;
    a control unit configured to:
        determine, based on pixel information of at least one section in the first image and pixel information of at least one corresponding section in the second image, a first motion map indicating an estimated motion between the at least one section in the first image and the at least one corresponding section in the second image;
        determine a second motion map by extrapolating or interpolating the first motion map, wherein the second motion map indicates an estimated motion between the at least one section in the first image and at least one corresponding section in the third image, or an estimated motion between the at least one corresponding section in the second image and the at least one corresponding section in the third image; and
        generate an at least partially motion compensated image by applying the second motion map to the at least one corresponding section in the third image.

2. The system according to claim 1, wherein the control unit is configured to:
    determine the first motion map indicating the estimated motion between the first image and the second image based on the pixel information of the first image and the pixel information of the second image;
    determine the second motion map based on the first motion map, wherein the second motion map indicates the estimated motion between the second image and the third image; and
    generate the motion compensated image by applying the second motion map to the third image.

3. The system according to claim 2, wherein the plurality of images are captured such that the first, second, and third images are captured in the sequence of: the first image, the second image, and the third image, or in the sequence of: the third image, the second image, and the first image, and
    wherein the second motion map is determined based on extrapolation of the first motion map, and wherein the extrapolation of the first motion map comprises performing an additive inversion of the first motion map.

4. The system according to claim 2, wherein the plurality of images are captured such that the first, second, and third images are captured in the sequence of: the first image, the third image, and the second image, and
    wherein the second motion map is determined based on interpolation of the first motion map.

5. The system according to claim 2, wherein the control unit is further configured to generate an ambient light corrected image by performing a subtraction operation between pixel information corresponding to the at least partially motion compensated image and pixel information corresponding to the first image or the second image.

6. The system according to claim 1, wherein the plurality of images further comprise a fourth image,
    wherein the plurality of images are captured such that the first, second, third, and fourth images are captured in the sequence of: the fourth image, the first image, the second image, and the third image,
    wherein the first image, the second image, and the fourth image are captured during the on-phase of the pulsed illumination from the light source, and the third image is captured during the off-phase of the pulsed illumination from the light source, and
    wherein the control unit is configured to:
        determine the first motion map indicating the estimated motion between the first image and the second image based on the pixel information of the first image and the pixel information of the second image;
        determine a third motion map indicating an estimated motion between the first image and the fourth image based on the pixel information of the first image and pixel information of the fourth image;
        determine the second motion map indicating the estimated motion between the second image and the third image based on extrapolation of the first motion map and the third motion map; and
        generate the motion compensated image by applying the second motion map to the third image.

7. The system according to claim 1, wherein the imaging unit is a rolling shutter camera, and the imaging unit is configured to capture the plurality of images at an exposure time shorter than the wave period of the pulsed illumination, such that each of the plurality of images comprises a plurality of bright bands and dark bands, wherein a bright band corresponds to a high state of the pulsed illumination and a dark band corresponds to a low state of the pulsed illumination,
wherein the pulse frequency of the illumination provided by the light source is not a multiple integral of the frame rate at which the plurality of images are captured,
wherein one of the first image and the second image is captured directly before or after the third image, and
wherein the control unit is configured to:
select the third image as a base image;
determine the first motion map based on pixel information of a first section in the first image and pixel information of a second section in the second image, the first motion map indicating an estimated motion between the first section and the second section, wherein the first section and the second section both correspond to a part of a bright band in the respective images, and the first section and the second section both positionally correspond to a third section in the third image, wherein the third section corresponds to a part of a dark band in the third image;
determine the second motion map based on extrapolation of the first motion map, wherein the second motion map indicates an estimated motion between the first section and the third section, or an estimated motion between the second section and the third section; and
generate the partially motion compensated image by applying the second motion map to the third section.

8. The system according to claim 7, wherein the control unit is further configured to:
determine a bright band motion map for each of one or more sections in the base image which positionally corresponds to a part of the dark band in the base image and positionally corresponds to a part of the bright band in each of two images that are adjacent to the base image, wherein one of the two adjacent images is captured directly before or after the base image;
determine, for each of the one or more bright band motion maps, one or more extrapolated motion maps, wherein each of the one or more extrapolated motion maps indicates an estimated motion between the respective section in the base image and the corresponding section in the image captured directly before or after the base image; and
generate a first motion compensated image by applying the second motion map and the one or more extrapolated motion maps, wherein the first motion compensated image is associated with high states of the pulsed illumination.

9. The system according to claim 8, wherein the control unit is further configured to:
determine one or more dark band motion maps for each of the one of more sections in the base image which positionally corresponds to a part of the bright band in the base image and positionally corresponds to a part of the dark band in at least one of two images that are adjacent to the base image, wherein one of the two images is captured directly before the base image and another one of the two images is captured directly after the base image;
determine, for each of the one or more dark band motion maps, an extrapolated motion map, wherein each of the extrapolated motion maps indicates an estimated motion between the respective section in the base image and the corresponding section in the image captured directly before or after the base image; and
generate a second motion compensated image by applying the one or more extrapolated motion maps, wherein the second motion compensated image is associated with low states of the pulsed illumination.

10. The system according to claim 9, wherein the control unit is further configured to:
generate a first composite image by combining the plurality of bright bands in the first motion compensated image with estimated bright bands based on applying the one or more extrapolated motion maps associated with bright bands in the other images in the plurality of images;
generate a second composite image by combining the plurality of dark bands in the second motion compensated image with estimated dark bands based on applying the one or more extrapolated motion maps associated with dark bands in the other images in the plurality of images;
generate an ambient light corrected image based on a difference in pixel information between the first composite image and the second composite image.

11. A method for performing image motion compensation, the method comprising:
providing pulsed illumination to an object;
capturing, while the object is illuminated by the pulsed illumination from the light source, a plurality of images of the object, wherein the plurality of images comprises at least a first image, a second image, and a third image, wherein the first and second images are captured by the imaging unit during an on-phase of the pulsed illumination from the light source, and the third image is captured by the imaging unit during an off-phase of the pulsed illumination from the light source;
determining, based on pixel information of at least one section in the first image and pixel information of at least one corresponding section in the second image, a first motion map indicating an estimated motion between at least one section in the first image and the at least one corresponding section in the second image;
determining a second motion map by extrapolating or interpolating the first motion map, wherein the second motion map indicates an estimated motion between the at least one section in the first image and at least one corresponding section in the third image, or an estimated motion between the at least one corresponding section in the second image and at least one corresponding section in the third image; and
generating an at least partially motion compensated image by applying the second motion map to the at least one corresponding section in the third image.

12. The method according to claim 11,
wherein the first motion map is determined based on the pixel information of the first image and the pixel information of the second image, and the first motion map indicates the estimated motion between the first image and the second image,
wherein the second motion map is determined based on the first motion map, and the second motion map indicates the estimated motion between the second image and the third image, and wherein the motion compensated image is generated by applying the second motion map to the third image.

13. The method according to claim 12, wherein the plurality of images are captured such that the first, second, and third images are captured in the sequence of: the first image, the second image, and the third image, or in the sequence of: the third image, the second image, and the first image, and wherein the second motion map is determined based on extrapolation of the first motion map, and wherein the extrapolation of the first motion map comprises performing an additive inversion of the first motion map.

14. The method according to claim 12, wherein the plurality of images are captured such that the first, second, and third images are captured in the sequence of: the first image, the third image, and the second image, and wherein the second motion map is determined based on performing an interpolation operation of the first motion map.

15. The method according to claim 11, wherein the plurality of images further comprise a fourth image, wherein the plurality of images are captured such that the first, second, third, and fourth images are captured in the sequence of: the fourth image, the first image, the second image, and the third image, wherein the first image, the second image, and the fourth image are captured during the on-phase of the pulsed illumination from the light source, and the third image is captured during the off-phase of the pulsed illumination from the light source, wherein the method further comprises determining a third motion map indicating an estimated motion between the first image and the fourth image based on the pixel information of the first image and pixel information of the fourth image;

wherein the first motion map is determined based on the pixel information of the first image and the pixel information of the second image, and the first motion map indicates the estimated motion between the first image and the second image, wherein the second motion map is determined based on extrapolation of the first motion map and the third motion map, and the second motion map indicates the estimated motion between the second image and the third image, and wherein the motion compensated image is generated by applying the second motion map to the third image.

* * * * *